(12) United States Patent
Mazur

(10) Patent No.: US 7,986,419 B2
(45) Date of Patent: Jul. 26, 2011

(54) PERFORMANCE OPTIMIZATION METHOD FOR NETWORK PRINTERS

(75) Inventor: Chris Mazur, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 986 days.

(21) Appl. No.: 11/900,526

(22) Filed: Sep. 12, 2007

(65) Prior Publication Data

US 2009/0067004 A1    Mar. 12, 2009

(51) Int. Cl.
G06F 3/12 (2006.01)
G06F 7/38 (2006.01)
H04N 1/60 (2006.01)
(52) U.S. Cl. ........ 358/1.13; 358/1.9; 358/1.15; 708/524
(58) Field of Classification Search ............ 358/1.9, 358/1.13, 1.15; 708/524
See application file for complete search history.

(56) References Cited

U.S. PATENT DOCUMENTS

| 5,835,624 | A | * | 11/1998 | Ueda et al. | 382/162 |
| 6,084,688 | A | | 7/2000 | Stumbo et al. | 358/1.17 |
| 2004/0105114 | A1 | * | 6/2004 | Tomomatsu | 358/1.13 |
| 2007/0182991 | A1 | * | 8/2007 | Matsuda | 358/1.15 |
| 2008/0007754 | A1 | * | 1/2008 | Torii | 358/1.12 |

* cited by examiner

Primary Examiner — Twyler L Haskins
Assistant Examiner — Fred Guillermety
(74) Attorney, Agent, or Firm — Kermit D. Lopez; Luis M. Ortiz; Ortiz & Lopez, PLLC

(57) ABSTRACT

A method for optimizing the performance of a network printer comprising: scanning the input print data stream in a raster image processor and processing the entire input print data stream in a page parallel processing pathway where said input print data stream is in a page independent form; otherwise selecting the processing pathway corresponding to a lower processing time period and thereafter processing the entire input print data stream using said selected processing pathway.

20 Claims, 2 Drawing Sheets

PERFORMANCE OPTIMIZATION METHOD FOR NETWORK PRINTERS

FIELD OF THE INVENTION

The present invention relates to a method for optimizing the performance of a network printer. The present invention particularly relates to a method for optimizing the performance of a network printer by default invoking the page parallel image processing pathway while switching to a caching enabled sequential processing method only when required.

BACKGROUND OF THE INVENTION

A majority of offices today have one or more laser printers which are connected to several host computers on the local area network enabling multiple users to print documents from their user terminals. The printer controllers provided within the laser printers receive the page data stream to be printed from each of the host computer separately and handles the print requests received from several host computers concurrently.

The printer controller communicates with the host computers on the network in a page description language to receive the print data stream through communication ports such as parallel ports or USB ports. However, with the advancement in the complexity of the text and graphic information printed now-a-day, conventional page description languages, which described a page data as a bitmap image, have evolved to advanced languages such as printer command language and Postscript®, which describe a page data in a vector form. The modern network printers are adapted to receive such vector images and thereafter transform them to bitmap images.

The modern day printers are provided with raster image processors which receive the input page data in a high level page description language such as printer command language, Postscript® or bitmap images of lower resolution and "normalize" the received image data to produce the high resolution output bitmap image. These output bitmap images are thereafter communicated to the printing hardware for printing. It is further known that these raster image processors can be implemented either as a software component of an operating system or as a firmware program executed on a microprocessor provided within the printer.

These raster image processors are further adapted to store the high resolution output bitmap stream in its internal memory before communicating such bitmap streams for printing to the printing hardware. In a network printer dedicated to a plurality of network host computers, the raster image processor designates multiple output bitmap images into a printing queue and communicates these output bitmap streams to the printing hardware in a pre-defined sequence. It may further be required to compress and decompress the normalized print data at least once before it is finally communicated to the printing hardware.

In the page parallel normalization of the print data, a multi-page job described in the Postscript® page description language is first converted into portable document format. The portable document format being a page independent form enables a multi-page print data to be divided into subsets of data, wherein each of the subset may correspond to one of the multiple pages constituting the print data. A plurality of such pages is thereafter communicated to a plurality of raster image processors provided within the printer simultaneously to independently normalize each individual page data. This ensures that a number of pages in multi-page print document may be normalized in parallel thereby reducing the time required to normalize an entire multi-page print job.

The other page description language known as the printer command language allows a relatively large population of host computers on a local area network to submit jobs at random times to a high speed printing hardware. This method uses a plurality of independent raster image processors adapted to normalize print data provided in different page description languages. This method directs the print jobs coming over the network to different raster image processors based on the compatibility between the job print data and the particular raster image processor assigned to normalize the print data. This method further comprises tracking each individual pages emerging from the raster image processors at random times. These normalized page images are stored within the provided internal memory until the arrival of the precise time window during which a particular normalized page data is communicated and printed through the printing hardware.

U.S. Pat. No. 6,084,688, assigned to Xerox Corporation, discloses an arrangement by which the page parallel processing of input page data in Postscript® page description language is integrated with the high-speed multi-user method of the printer command language. The disclosed method comprises retaining normalized image data from a first normalizing means and a second normalizing means into a provided memory comprising a plurality of buffers, each said buffer being adapted to retain the normalized page data corresponding to one input page data. The first buffer provided within the provided memory is accessed when the first input page data is normalized and likewise a second buffer is accessed when the second input page is normalized. The second buffer in the provided memory is accessed and receives the second normalized page data before the first input page data is normalized in said first normalizing means thereby maintaining a sequence between the normalization and storage of successive input page data.

However, the prior method could stand to be more computationally efficient as it determines the appropriate normalization method based on the input data image compatibility with either of the normalization methods, and would be better if the time performance of a selected method for normalizing a particular input print data stream were considered.

SUMMARY OF THE INVENTION

Accordingly, it is an object of the present invention to provide a method for optimizing the performance of a network printer by default invoking the page parallel image processing pathway while switching to a sequential method only when required.

Yet another object of the present invention is to provide a method for optimizing the performance of a network printer that helps automate parallelization of normalization of input page data while resorting to a sequential normalization method only when required.

Yet another object of the present invention is to provide a method that optimizes the performance of a network printer by selecting between page parallel processing pathway and caching enabled sequential processing pathway without running an actual instance of the print job.

Yet another object of the present invention is to provide a method for optimizing the performance of a network printer by invoking a page parallel processing pathway without an actual human intervention.

Another object of the present invention is to provide a method for optimizing the performance of a network printer that filters out instances of input page data that are incapable of page parallel processing.

Another object of the present invention is to provide a method for optimizing the performance of a network printer which ensures maximum time performance of an input print data stream.

Accordingly, in one aspect, the present invention provides a method for optimizing the performance of a network printer comprising: scanning the input print data stream in a raster image processor and processing the entire input print data stream in a page parallel processing pathway where said input print data stream is in a page independent form; otherwise determining the page description language in which said input print data stream is expressed; creating a first subset and a second subset of said input print data stream; normalizing said first subset through a provided raster image processor through a caching enabled sequential processing pathway and determining the first time period required to normalize the first subset of the input print data stream; normalizing said second subset through a provided raster image processor through a page parallel pathway and determining the second time period required to normalize the second subset of the input print data stream; comparing said first and second time periods and determining the lower of said first and second time periods; and selecting the processing pathway corresponding to said determined lower time period and thereafter processing the entire input print data stream using said selected processing pathway.

BRIEF DESCRIPTION OF THE DRAWINGS

The invention will now be described in connection with the drawings described hereinafter.

DETAILED DESCRIPTION OF THE INVENTION

Figure 1:
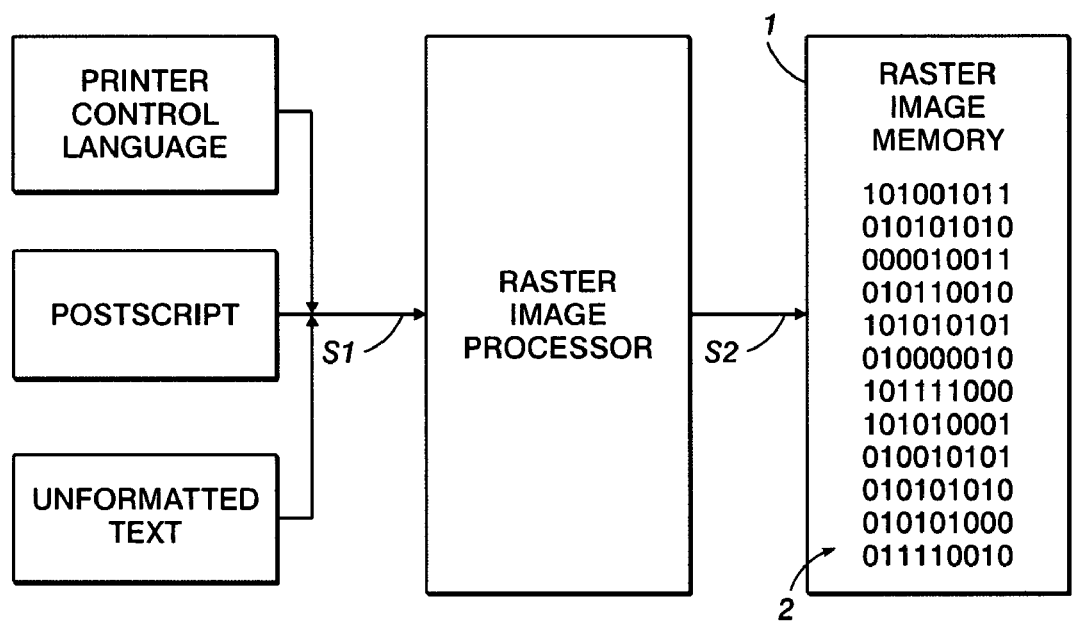
FIG. 1 illustrates a normalization method conventionally practiced in the art.

In accordance with an exemplary embodiment of the invention, there is provided a method for optimizing the performance of a network printer comprising:

scanning the input print data stream in a raster image processor and processing entire said input print data stream in a page parallel processing pathway where said input print data stream is in a page independent form; otherwise:

determining the page description language in which said input print data stream is expressed;

creating a first subset and a second subset of said input print data stream;

processing said first subset through a provided raster image processor using a caching enabled sequential processing pathway and determining the first time period required to process the first subset of the input print data stream through the caching enabled sequential processing pathway;

normalizing and subsequently processing said second subset through a provided raster image processor through a page parallel pathway and determining the second time period required to normalize and process the second subset of the input print data stream through the page parallel processing pathway, wherein a failure of normalization of said second subset triggers the entire input page data stream to be processed using the caching enabled sequential processing pathway;

comparing said first and second time periods and determining the lower of said first and second time periods; and selecting the processing pathway corresponding to said determined lower time period and thereafter processing the entire input print data stream using said selected processing pathway.

According to an embodiment, an input print data stream or a created subset thereof that is not page independent is normalized to a page independent form before it is processed through the page parallel pathway.

In an embodiment, the method of the present invention comprises processing an input print data stream through the caching enabled sequential processing pathway wherein the input print data stream is found ineligible for being processed according to page parallel processing pathway.

In another embodiment, the method according to the present invention additionally includes reporting the instances of the input print data stream which are found ineligible for being processed according to page parallel processing pathway. According to the present invention, the occurrence of such ineligible input print data streams prompts the print provider to license and/or enable page parallel processing pathway.

Therefore, according to the present invention, a page independent input print data stream is automatically processed according to the page parallel processing pathway, whereas an input print data stream which is not in an page independent form is processed using either a caching enabled sequential processing pathway or a page parallel processing pathway depending upon the time performance of said individual pathways on a created subset of the input print data stream.

The method according to the present invention invokes the page parallel processing pathway for processing an input page data stream by default. The disclosed method enables the further processing of an input page data stream ineligible for page parallel processing pathway through either a caching enabled sequential processing pathway or normalization followed by page parallel processing pathway depending upon the time performance of each of these pathways without actually executing an instance of the print data stream. The method of the present invention further enables the said optimization to be performed automatically without a direct manual intervention. Another advantage of the method according to the present invention is that in the event that the second subset of the input page data stream fails to normalize, the entire data stream is automatically triggered to be processed using the caching enabled sequential processing pathway. This leads to a considerable optimization of the processing performance, eliminates the possibility of an incorrect setting of the processing pathway at the system, queue or component level of processing.

In an exemplary embodiment, the method of the present invention therefore rules out the possibility of an input page data stream being processed through the caching enabled sequential pathway when normalization followed by page parallel processing pathway would have been the best choice computationally. This method therefore also enables filtering the input page data streams that are ineligible for being processed according to the page parallel processing pathway and processing the same through caching enabled sequential processing pathway.

Referring to FIG. 1, illustrated is a method producing a bitmap image, which is communicated to the printing hardware for printing. The raster image processor receives (S1) an input print page data stream in a page description language such as printer control language, Postscript® or in an unformatted text form. The raster image processor normalizes or processes the input page data stream using the caching enabled sequential processing pathway or page parallel processing pathway depending solely upon the input page data stream independent of the computational efficiency of the applied processing pathway, converts the same to a high level bitmap image (1) and communicates and stores (S2) the same in an internal memory buffer (2).

Figure 2:
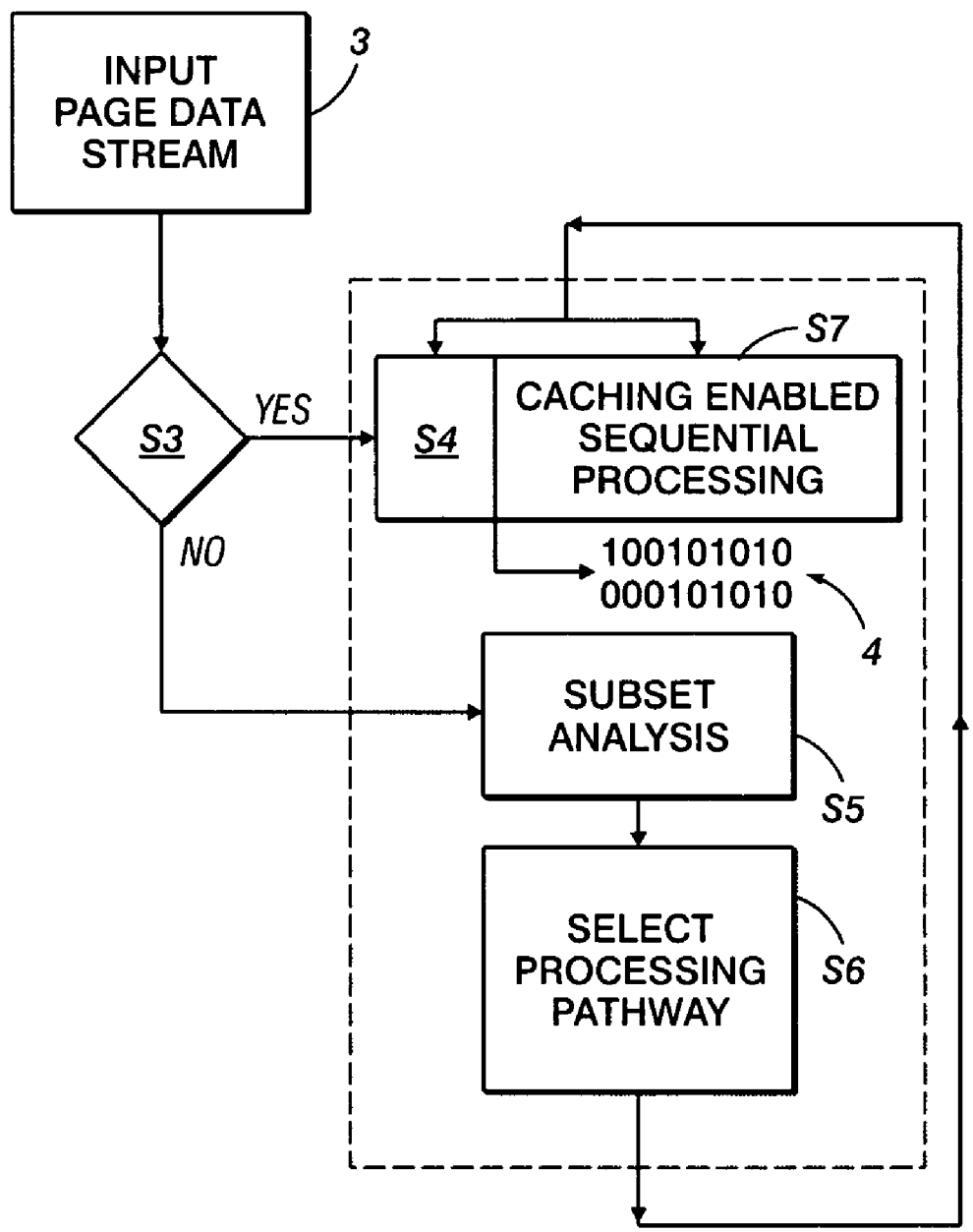
FIG. 2 illustrates a normalization method according to an aspect of the present invention.

Referring to FIG. 2, illustrated is a method for optimizing the performance of a network printer according to a preferred embodiment of the present invention. The input print data stream (3) is first scanned in a raster image processor, which decides (S3) whether the data stream is eligible for page parallel processing. If the input print data stream is found eligible for page parallel processing, it is normalized and processed (S4) in page parallel processing pathway to generate the output bitmap image (4). If the input print data stream is found ineligible for page parallel processing, a performance analysis (S5) is conducted on a subset of the print data stream according to the above described method to select the appropriate processing pathway (S6) i.e. either the page parallel processing pathway (S4) or the caching enabled sequential processing pathway (S7) to generate the output bitmap image (4).

Wherein foregoing reference has been made to integers or steps of the methods having known equivalents, then such equivalents are herein incorporated as if individually set forth. Accordingly, it will be appreciated that changes may be made to the above described embodiments of the invention without departing from the principles taught herein. Additional advantages of the present invention will become apparent for those skilled in the art after considering the principles in particular form as discussed and illustrated. Thus, it will be understood that the invention is not limited to the particular embodiments described or illustrated, but is intended to cover all alterations or modifications which are within the scope of the appended claims.

For example, although the above description is focused on variable input print data streams, the method described herein is applicable to non-variable print data streams such as monochrome and colored data streams as well, which are intended to be within the scope of the present invention.

What is claimed is:

1. A method for optimizing the performance of a network printer, said method comprising:
scanning the input print data stream in a raster image processor and processing entire said input print data stream in a page parallel processing pathway where said input print data stream is in a page independent form; otherwise:
determining the page description language in which said input print data stream is expressed;
creating a first subset and a second subset of said input print data stream;
processing said first subset through a provided raster image processor using a caching enabled sequential processing pathway and determining the first time period required to process the first subset of the input print data stream through the caching enabled sequential processing pathway;
normalizing and subsequently processing said second subset through a provided raster image processor through a page parallel pathway and determining the second time period required to normalize and process the second subset of the input print data stream through the page parallel processing pathway, wherein a failure of normalization of said second subset triggers the entire input page data stream to be processed using the caching enabled sequential processing pathway;
comparing said first and second time periods and determining the lower of said first and second time periods; and
selecting the processing pathway corresponding to said determined lower time period and thereafter processing the entire input print data stream using said selected processing pathway.

2. A method for optimizing the performance of a network printer as claimed in claim 1 additionally comprising the step of normalizing an input print data stream or a created second subset thereof which is not page independent to a page independent form before being processed according to the page parallel processing pathway.

3. A method for optimizing the performance of a network printer as claimed in claim 1 comprising processing an input print data stream through the caching enabled sequential processing pathway wherein the input print data stream is found ineligible for being processed according to page parallel processing pathway.

4. A method for optimizing the performance of a network printer as claimed in claim 1 additionally comprising the step of reporting the instances of the input print data stream which are found ineligible for being processed according to page parallel processing pathway.

5. A method for optimizing the performance of a network printer as claimed in claim 4, wherein said reporting the occurrence of ineligible input print data streams prompts the print provider to license and/or enable page parallel processing pathway.

6. A method for optimizing the performance of a network printer as claimed in claim 1, wherein a normalization failure of said second subset of said input print data stream triggers the entire input print data stream to be processed according to the caching enabled sequential processing pathway.

7. A method for optimizing the performance of a network printer as claimed in claim 1 adapted to enable filtering the input page data streams that are ineligible for being processed according to the page parallel processing pathway.

8. A method for optimizing the performance of a network printer as claimed in claim 7 wherein said filtered input page data streams are processed through the caching enabled sequential processing pathway.

9. A network printer performance optimization method, comprising:
scanning the input print data stream in a raster image processor and processing entire said input print data stream in a page parallel processing pathway where said input print data stream is in a page independent form; otherwise:
determining the page description language in which said input print data stream is expressed;
creating a first subset and a second subset of said input print data stream;
processing said first subset through a provided raster image processor using a caching enabled sequential processing pathway and determining the first time period required to process the first subset of the input print data stream through the caching enabled sequential processing pathway;
normalizing and subsequently processing said second subset through a provided raster image processor through a page parallel pathway and determining the second time period required to normalize and process the second subset of the input print data stream through the page parallel processing pathway, wherein a failure of normalization of said second subset triggers the entire input page data stream to be processed using the caching enabled sequential processing pathway;

comparing said first and second time periods and determining the lower of said first and second time periods;

selecting a processing pathway corresponding to said determined lower time period and thereafter processing the entire input print data stream using said processing pathway; and reporting instances of the input print data stream which are found ineligible for being processed according to page parallel processing pathway.

10. A network printer performance optimization method as claimed in claim 9 additionally comprising the step of normalizing an input print data stream or a created second subset thereof which is not page independent to a page independent form before being processed according to said parallel processing pathway.

11. A network printer performance optimization method as claimed in claim 9 comprising processing an input print data stream through the caching enabled sequential processing pathway wherein the input print data stream is found ineligible for being processed according to page parallel processing pathway.

12. A network printer performance optimization method as claimed in claim 11, wherein said reporting the occurrence of ineligible input print data streams prompts the print provider to license and/or enable page parallel processing pathways.

13. A network printer performance optimization method as claimed in claim 9, wherein a normalization failure of said second subset of said input print data stream triggers the entire input print data stream to be processed according to the caching enabled sequential processing pathway.

14. A network printer performance optimization method as claimed in claim 9 adapted to enable filtering the input page data streams that are ineligible for being processed according to the page parallel processing pathway.

15. A network printer performance optimization method as claimed in claim 14 wherein said filtered input page data streams are processed through the caching enabled sequential processing pathway.

16. A method for optimizing the performance of a network printer, said method comprising:

scanning the input print data stream in a raster image processor and processing entire said input print data stream in a page parallel processing pathway where said input print data stream is in a page independent form; otherwise:

determining the page description language in which said input print data stream is expressed;

creating a first subset and a second subset of said input print data stream;

processing said first subset through a provided raster image processor using a caching enabled sequential processing pathway and determining the first time period required to process the first subset of the input print data stream through the caching enabled sequential processing pathway;

normalizing an input print data stream or a created second subset thereof which is not page independent to a page independent form;

normalizing and subsequently processing said second subset through a provided raster image processor through a page parallel pathway and determining the second time period required to normalize and process the second subset of the input print data stream through the page parallel processing pathway, wherein a failure of normalization of said second subset triggers the entire input page data stream to be processed using the caching enabled sequential processing pathway;

processing an input print data stream through the caching enabled sequential processing pathway wherein the input print data stream is found ineligible for being processed according to page parallel processing pathway;

comparing said first and second time periods and determining the lower of said first and second time periods; and selecting the processing pathway corresponding to said determined lower time period and thereafter processing the entire input print data stream using said selected processing pathway.

17. A method for optimizing the performance of a network printer as claimed in claim 16 additionally comprising the step of reporting the instances of the input print data stream which are found ineligible for being processed according to page parallel processing pathway.

18. A method for optimizing the performance of a network printer as claimed in claim 17, wherein said reporting the occurrence of ineligible input print data streams prompts the print provider to license and/or enable page parallel processing pathway.

19. A method for optimizing the performance of a network printer as claimed in claim 16, wherein a normalization failure of said second subset of said input print data stream triggers the entire input print data stream to be processed according to the caching enabled sequential processing pathway.

20. A method for optimizing the performance of a network printer as claimed in claim 16 adapted to enable filtering the input page data streams that are ineligible for being processed according to the page parallel processing pathway and wherein said filtered input page data streams are processed through the caching enabled sequential processing pathway.

* * * * *